(12) United States Patent
Huang

(10) Patent No.: US 8,544,208 B2
(45) Date of Patent: Oct. 1, 2013

(54) PLANT CULTURE APPARATUS

(76) Inventor: Yii-Feng Huang, Tainan (TW)

( * ) Notice: Subject to any disclaimer, the term of this patent is extended or adjusted under 35 U.S.C. 154(b) by 309 days.

(21) Appl. No.: 13/012,998

(22) Filed: Jan. 25, 2011

(65) Prior Publication Data

US 2012/0186152 A1    Jul. 26, 2012

(51) Int. Cl.
*A01G 31/00*    (2006.01)

(52) U.S. Cl.
USPC .......................................... 47/60; 47/63; 47/69

(58) Field of Classification Search
USPC ............... 47/60, 59 R, 61, 63, 69, 64, 79–82, 47/48.5, 62 R, 62 A, 62 C, 62 E, 62 N
See application file for complete search history.

(56) References Cited

U.S. PATENT DOCUMENTS

| | | | | |
|---|---|---|---|---|
| 2,145,934 A | * | 2/1939 | Kingman | 47/47 |
| 2,453,906 A | * | 11/1948 | Hamlet | 47/41.11 |
| 4,180,941 A | * | 1/1980 | Korematsu | 47/14 |
| 4,979,332 A | * | 12/1990 | Nagaya et al. | 47/69 |
| 5,321,908 A | * | 6/1994 | Ushimaru | 47/69 |
| 5,375,372 A | * | 12/1994 | Lee et al. | 47/69 |
| 5,561,946 A | * | 10/1996 | Hsien et al. | 47/69 |
| 5,927,007 A | * | 7/1999 | Oda et al. | 47/60 |

FOREIGN PATENT DOCUMENTS

JP    62259514 A    * 11/1987

* cited by examiner

*Primary Examiner* — Kristen C Hayes
(74) *Attorney, Agent, or Firm* — Banner & Witcoff, Ltd.

(57) ABSTRACT

A plant culture apparatus includes: a culture container including a transparent surrounding wall, a top opening, and a cover to close the top opening; a liquid culture medium disposed inside the culture container and having a liquid surface distal from the cover; a plant support fixed inside the culture container; a plant supported by the plant support; and a solid culture medium disposed within the culture container above the liquid surface. The solid culture medium is dissolvable in the liquid culture medium when the liquid culture medium is caused to contact the solid culture medium.

5 Claims, 6 Drawing Sheets

PLANT CULTURE APPARATUS

BACKGROUND OF THE INVENTION

1. Field of the Invention

This invention relates to a culture apparatus, more particularly to a plant culture apparatus.

2. Description of the Related Art

With promotion of plant cultivation techniques, a number of ornamental plants can be currently planted in a closed plant culture apparatus. Generally, as shown in FIG. 1, the conventional closed plant culture apparatus 1 includes a transparent culture container 11 and a cover 12 to air-tightly close the culture container 11. A culture medium 10 such as agar is disposed in the culture container 11, and roots 21 of the ornamental plant 2 are planted in the culture medium 10. Hence, the plant 2 is able to obtain nourishment from the culture medium 10 and carry out photosynthesis utilizing the light penetrating through the transparent culture container 11.

However, the inner surface of the culture container 11 is usually adhered with moisture produced from volatilization of the culture medium 10 and photosynthesis of the plant 2. The inner surface of the culture container 11 is then fogged by the moisture adhered thereto, so that the plant 2 cannot be seen clearly from the outside, and that the ornamental value of the plant culture apparatus 1 is decreased. Additionally, the nourishment included in the culture medium 10 is limited, and the plant 2 tends to wilt due to lack of nourishment after being planted in the plant culture apparatus 1 for a period of time. Hence, the period for the plant 2 to be admired is relatively short.

SUMMARY OF THE INVENTION

Therefore, an object of the present invention is to provide a plant culture apparatus that can overcome the aforesaid drawbacks associated with the prior art.

According to this invention, there is provided a plant culture apparatus comprising:

a culture container including a transparent surrounding wall, a top opening, and a cover to close the top opening;

a liquid culture medium disposed inside the culture container and having a liquid surface distal from the cover;

a plant support fixed inside the culture container;

a plant supported by the plant support; and a solid culture medium disposed within the culture container above the liquid surface, the solid culture medium being dissolvable in the liquid culture medium when the liquid culture medium is caused to contact the solid culture medium.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
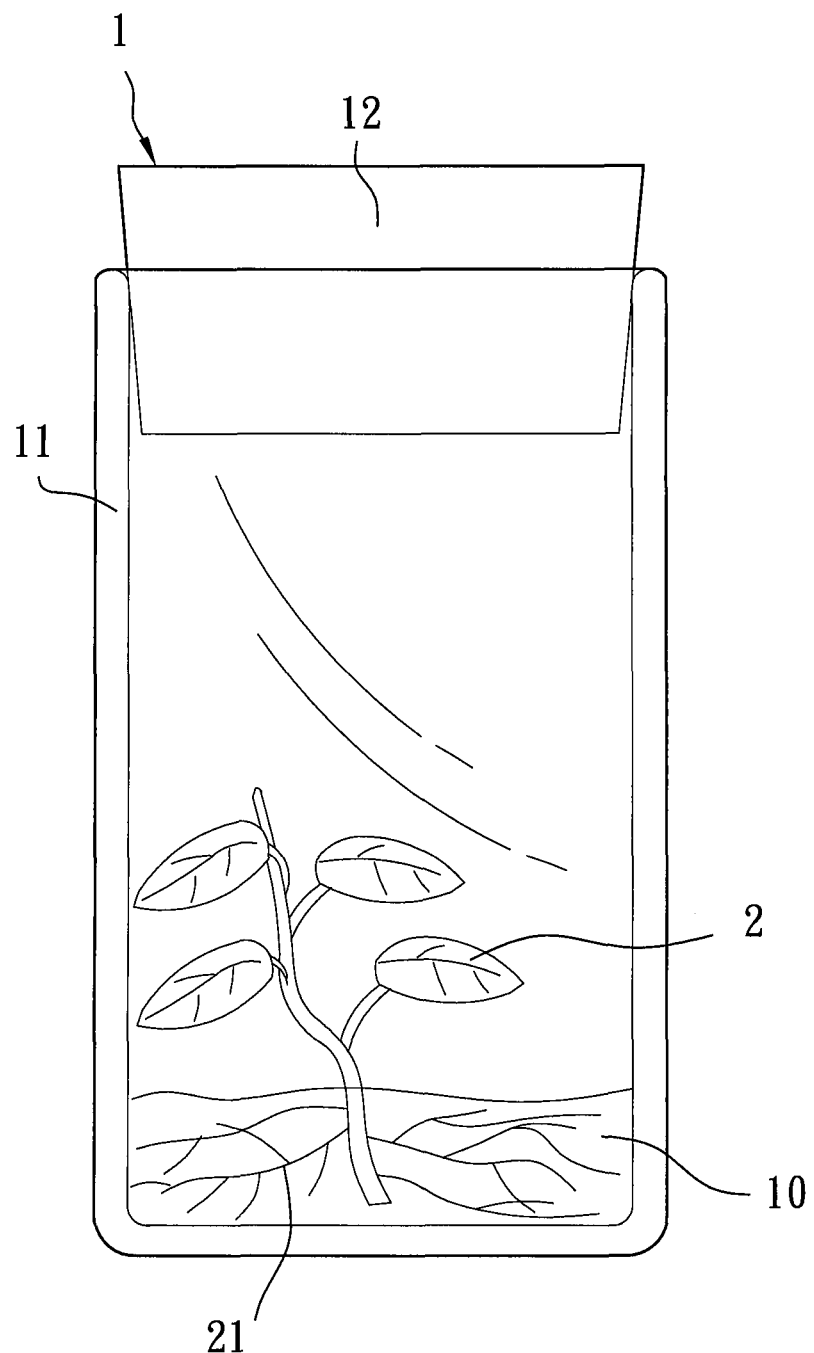
FIG. 1 is a schematic side view of a conventional plant culture apparatus.

Before the present invention is described in greater detail with reference to the accompanying preferred embodiments, it should be noted herein that like elements are denoted by the same reference numerals throughout the disclosure.

Figure 2:
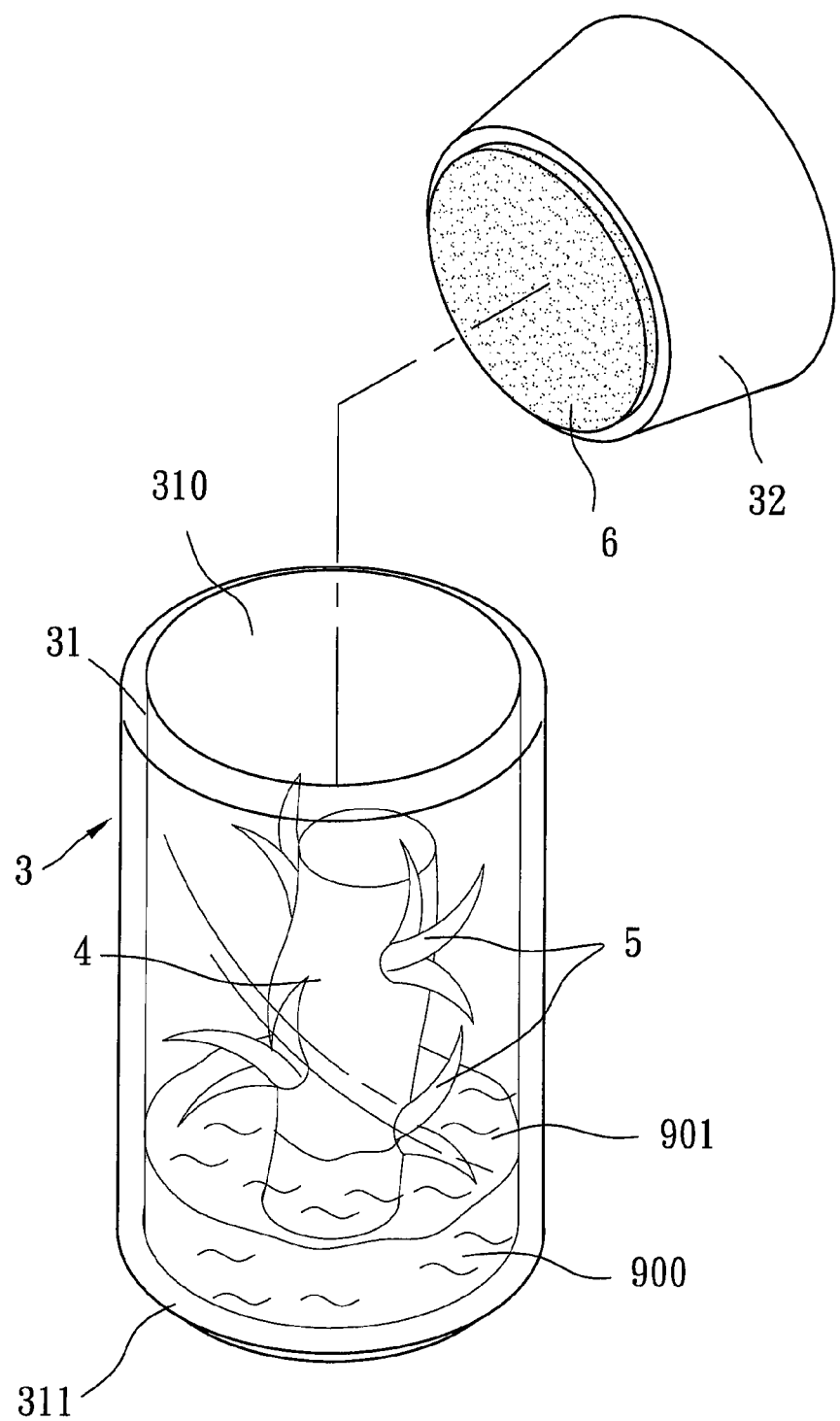
FIG. 2 is an exploded perspective view of a plant culture apparatus according to the first preferred embodiment of the present invention.
Figure 3:
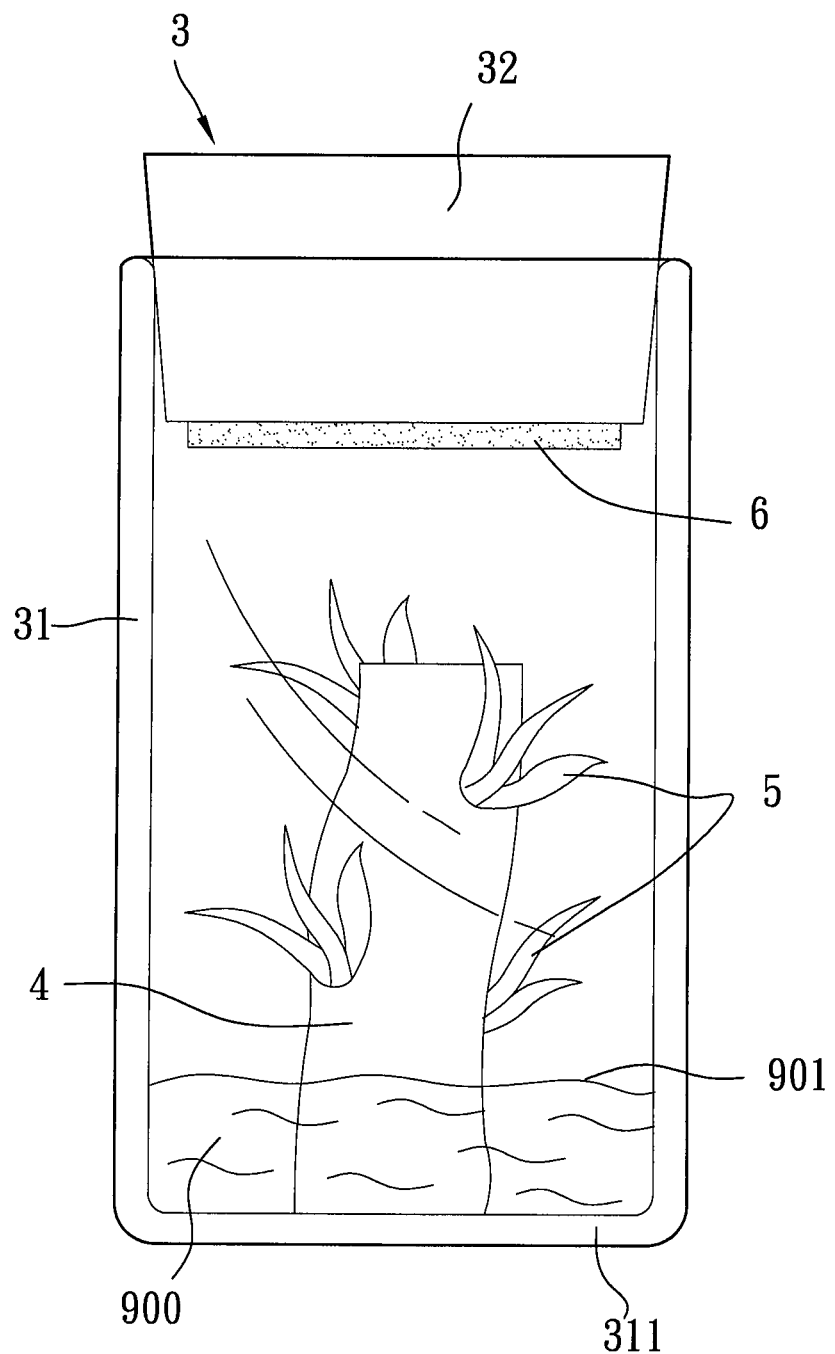
FIG. 3 is a schematic view of the first preferred embodiment.

Referring to FIGS. 2 and 3, a plant culture apparatus according to the first preferred embodiment of this invention comprises a culture container 3, a liquid culture medium 900, a plant support 4, a plant 5, and a solid culture medium 6.

The culture container 3 includes a transparent surrounding wall 31, a top opening 310, and a cover 32 to close the top opening 310. Preferably, the top opening 310 is fluid-impermeably closed by the cover 32. The liquid culture medium 900 is disposed inside the culture container 3 and has a liquid surface 901 distal from the cover 32. The plant support 4 is fixed inside the culture container 3. The plant 5 is supported by the plant support 4. In this embodiment, there are a plurality of plants 5 supported by the plant support 4.

In this embodiment, preferably, the plant support 4 can absorb the liquid culture medium 900, and is fixed to a bottom 311 of the culture container 3 and immersed in the liquid culture medium 900. Optionally, the plant support 4 may be a rod formed of any material capable of absorbing the liquid culture medium 900 along the lengthwise direction of the rod, for instance, wood, bamboo, other plant fibers, etc. The plants 5 supported by the plant support 4 may climb on the plant support 4 with their roots so as to absorb the liquid culture medium 900 that is absorbed by the plant support 4.

The solid culture medium 6 is disposed within the culture container 3 above the liquid surface 901. The solid culture medium 6 is dissolvable in the liquid culture medium 900 when the liquid culture medium 900 is caused to contact the solid culture medium 6.

Preferably, the cover 32 is a stopper, and the solid culture medium 6 is attached to the stopper. In one preferred embodiment, the solid culture medium 6 may be tablet(s) of nutrients or auxins required for plant growth. Since the solid culture medium 6 is dissolvable in the liquid culture medium 900, when the liquid culture medium 900 is caused to contact the solid culture medium 6, the solid culture medium 6 will topically dissolve in the liquid culture medium 900 so as to increase or supplement the contents of the nourishment such as the nutrients and/or auxins in the liquid culture medium 900.

Additionally, because the plant support 4 of the plant culture apparatus is capable of absorbing the liquid culture medium 900 to obtain the nourishment and the water contained therein, the plants 5 supported by the plant support 4 can directly absorb the liquid culture medium 900 from the plant support 4 to obtain the nourishment and the water in combination with the light penetrating through the transparent surrounding wall 31 to carry out photosynthesis.

When the transparent surrounding wall 31 is adhered with the moisture volatilized from the liquid culture medium 900 and produced from photosynthesis of the plants 5 after the plant culture apparatus is in use for a period of time, the moisture adhered to the transparent surrounding wall 31 may be removed by shaking the culture container 3 to bring the liquid culture medium 900 into contact with the moisture. Additionally, by shaking the culture container 3, the liquid culture medium 900 may also be brought into contact with the solid culture medium 6 attached to the cover 32. Accordingly the solid culture medium 6 will be dissolved in the liquid culture medium 900 so that the nourishment such as the nutrients and/or auxins in the liquid culture medium 900 can be replenished. Hence, the period for the plant 2 to be admired can be extended.

Figure 4:
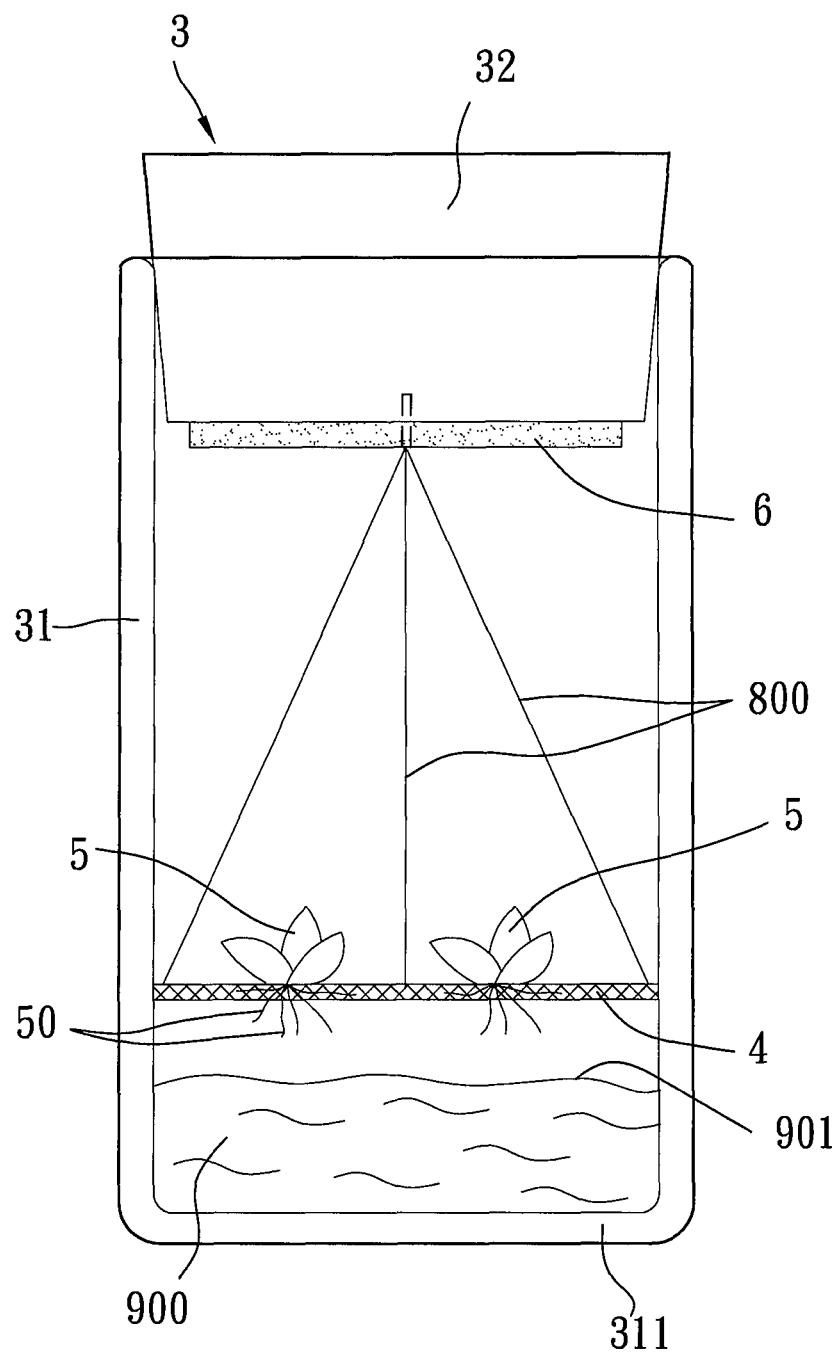
FIG. 4 is a schematic view of a plant culture apparatus according to the second preferred embodiment of the present invention.

FIG. 4 illustrates the second embodiment of the plant culture apparatus of this invention. The second embodiment differs from the first embodiment in that the plant support 4 is disposed above the liquid surface 901 of the liquid culture medium 900. Preferably, the plant support 4 is a net suspended above the liquid surface 901 from the cover 32 by strings 800. The plants 5 supported by the plant support 4 may climb on the net of the plant support 4 or penetrate through holes thereof with their aerial roots 50, and may obtain the nourishment and the water from the air via their aerial roots 50. Alternatively, the plant support 4 may be disposed on a surface of a support carrier (not shown) distal from the liquid surface 901 of the liquid culture medium 900. The support carrier may be fixed to the bottom 311 or the transparent surrounding wall 31 of the culture container 3.

Figure 5:
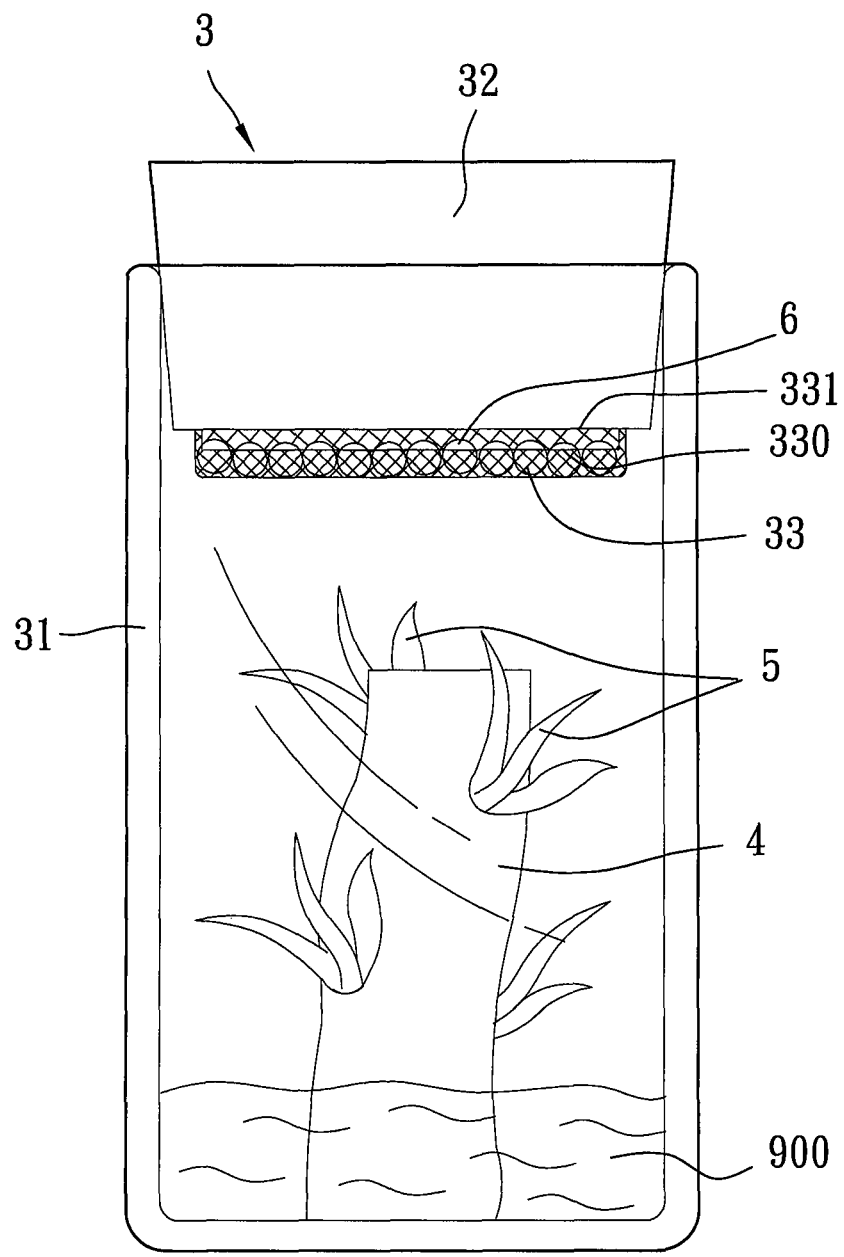
FIG. 5 is a schematic view of a plant culture apparatus according to the third preferred embodiment of the present invention.
Figure 6:
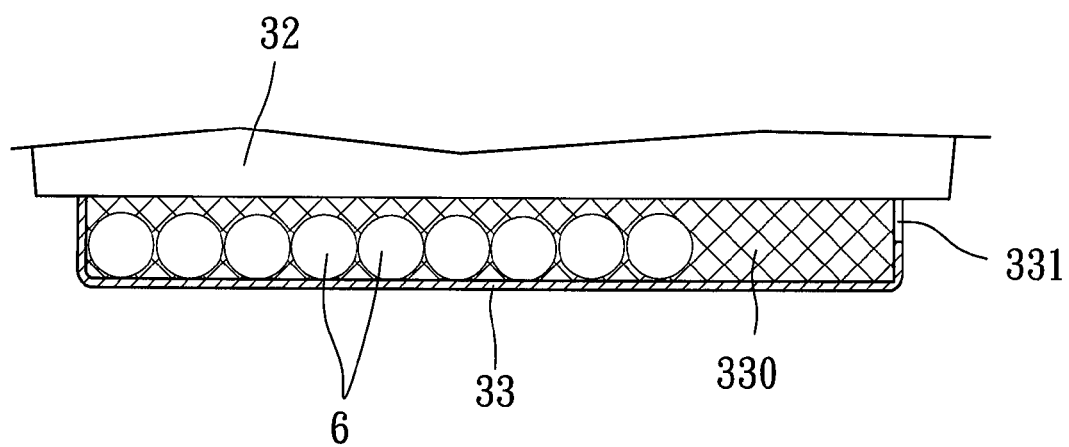
FIG. 6 is a fragmentary schematic view to illustrate a screen attached to a cover of the plant culture apparatus of the third preferred embodiment.

FIGS. 5 and 6 illustrate the third embodiment of the plant culture apparatus of this invention. The third embodiment differs from the first embodiment in that this embodiment further comprises a screen 33 attached to the cover 32 and confining a receiving space 330 to receive the solid culture medium 6. Preferably, the screen 33 has an outlet 331 for fallen leaves of the plants 5 suspended on the liquid culture medium 900 to enter the receiving space 330 when the culture container 3 is shaken. The solid culture medium 6 in this embodiment preferably has a particle shape or a lump shape which has a particle size larger than the pore size of the screen 33 and the outlet 331.

In view of the foregoing, by virtue of the design of the plant support 4, the liquid culture medium 900 and the solid culture medium 6 included in the plant culture apparatus of this invention, the aforesaid drawback associated with the prior art can be eliminated. In particular, when the transparent surrounding wall 31 is adhered with the moisture produced from volatilization of the liquid culture medium 900 or photosynthesis of the plants 5, the moisture adhered to the surrounding wall 31 may be removed by shaking the culture container 3 to bring the liquid culture medium 900 into contact with the moisture without resulting in removal of the plants 5. Moreover, by shaking the culture container 3 to bring the liquid culture medium 900 into contact with the solid culture medium 6, the solid culture medium 6 will dissolve so that the nourishment such as nutrients and/or auxins needed for the growth of the plants 5 in the liquid culture medium 900 can be replenished. Therefore the plants 5 will not wilt readily, and the period for the plant 2 to be admired can be extended.

Additionally, by virtue of the design for the outlet 331 of the screen 33, the culture container 3 can be turned upside-down to allow the fallen leaves of the plants 5 suspended on the liquid culture medium 900 to enter the receiving space 330 through the outlet 331 so as to be collected in the receiving space 330. Hence, the fallen leaves of the plants 5 will not disturb the appealing effect of the plant culture apparatus of the invention.

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

What is claimed is:

1. A plant culture apparatus comprising
    a culture container including a transparent surrounding wall, a top opening, and a cover to close said top opening;
    a liquid culture medium disposed inside said culture container and having a liquid surface distal from said cover;
    a plant support fixed inside said culture container;
    a plant supported by said plant support;
    a solid culture medium disposed within said culture container above said liquid surface, said solid culture medium being dissolvable in said liquid culture medium when said liquid culture medium is caused to contact said solid culture medium; and
    a screen attracted to said cover and confining a receiving space to receive said solid culture medium.

2. The plant culture apparatus of claim 1, wherein said cover is a stopper, and said solid culture medium is attached to said stopper.

3. The plant culture apparatus of claim 1, wherein said screen has an outlet for fallen leaves of said plant to enter said receiving space.

4. The plant culture apparatus of claim 1, wherein said plant support can absorb said liquid culture medium, and is fixed to a bottom of said culture container and immersed in said liquid culture medium.

5. The plant culture apparatus of claim 1, wherein said plant support is disposed above said liquid surface of said liquid culture medium.

* * * * *